Dec. 19, 1950     L. F. HOWARD     2,534,446
LOCKING DEVICE FOR NUTS AND BOLTS
Filed April 30, 1946
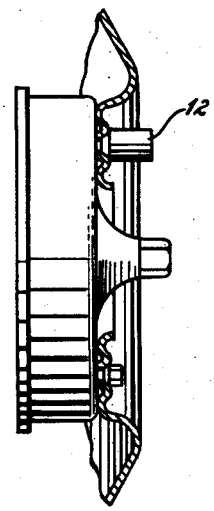
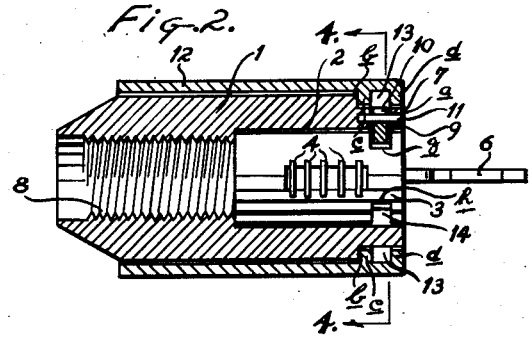
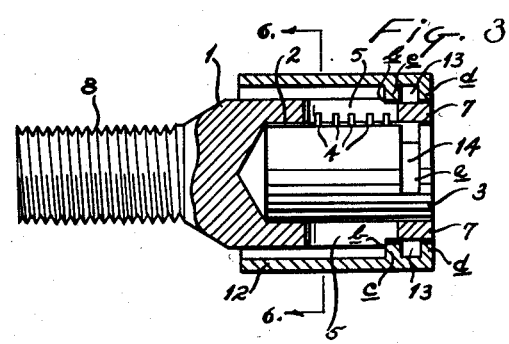
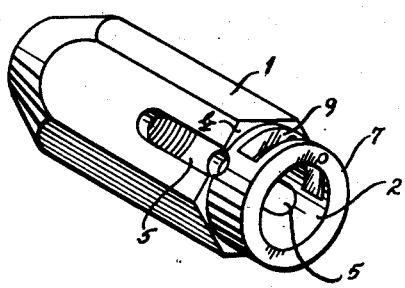
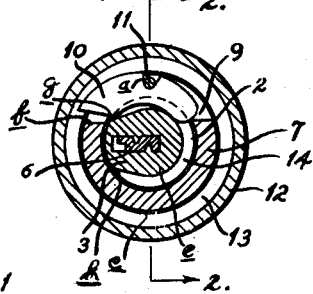
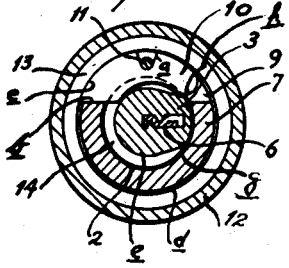
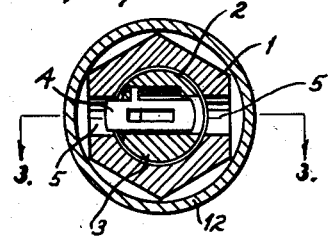
LEWIS F. HOWARD
INVENTOR.
BY Cecil L. Wood
ATTORNEY Patented Dec. 19, 1950

2,534,446

UNITED STATES PATENT OFFICE 2,534,446

LOCKING DEVICE FOR NUTS AND BOLTS

Lewis F. Howard, Fort Worth, Tex.

Application April 30, 1946, Serial No. 666,146

3 Claims. (Cl. 70—231)

1

This invention relates to locking devices for nuts and bolts to prevent the unauthorized removal of the same, and it has particular reference to locking devices especially adapted for use on nuts and bolts applied to automobile wheels, and the like, and its principal object resides in the provision of a lock adapted to both nuts and bolts to protect the same from being tampered with by unauthorized persons and thereby prevent the theft of wheels, and other parts, from motor vehicles, as well as other equipment where the application of such a device is found desirable.

An object of the invention resides in the provision of an especially designed nut or bolt having a bore arranged in one end thereof capable of receiving a lock which may be of conventional design but provided with features capable of effecting the retention of a cylindrical casing which envelopes the nut or bolt and freely rotates thereon to defeat the effectiveness of a wrench, or other suitable instrument, applied thereto for the purpose of unthreading the same, the enveloping cylinder being adapted to free rotation on the nut or bolt and retained thereon by the lock.

Broadly, the invention seeks to comprehend the provision of a dependable locking device of the character described which is simple in construction and design and yet light enough to be incapable of presenting any counter-balancing effect, when the device is applied to automobile wheels, and of such dimensions as to enable its being placed beneath the hub cap of a standard automobile without affecting the normal application and appearance of the said cap.

While the foregoing objects are paramount, other and lesser objects will become manifest as the description proceeds taken in connection with the appended drawings wherein:

Figure 1 is a fragmentary elevational view of the wheel hub of an automobile, showing a portion in cross section, and illustrating one form of the invention applied thereto.

Figure 2 is an axial cross sectional view of the invention as applied to a nut.

Figure 3 illustrates the embodiment of the invention in a bolt having a specially designed head in which the lock is installed and showing the same in locked position.

Figure 4 is a lateral cross sectional illustration taken on lines 4—4 of Figure 2 illustrating the locking mechanism in locked position.

Figure 5 illustrates the locking mechanism in unlocked position conversely to the position illustrated in Figure 4.

2

Figure 6 is a lateral cross sectional illustration taken on lines 6—6 of Figure 3, and Figure 7 is a perspective illustration of the adaptation of the invention as embodied in a nut, as also shown in Figure 2.

As stated, the invention contemplates the application of the novel device to bolts, as well as nuts, as illustrated in Figures 2 and 3, but practically no difference is apparent, with regard to the locking mechanism, between the two structures. The primary distinction resides in the shape of the main body of the invention which, in the form illustrated in Figure 2, embraces an internally threaded bore adapted to receive a bolt, while the form shown in Figure 3 embodies a threaded pintle adapted to be received by a conventional bolt socket.

Accordingly, therefore, the invention comprises a preferably polygonal body 1 having a bore 2 therein, preferably at one end thereof, adapted to receive a lock 3 which is generally of a conventional design, such as that illustrated in Figures 2 and 3. The lock 3 is provided with tumblers 4 adapted to enter either of the longitudinal slots 5 arranged in each side of the body 1 and communicating with the bore 2, as illustrated particularly in Figures 3, 6 and 7. The tumblers 4 are, of course, actuated by the key 6 which causes the same to be extended into the slots 5 when the lock 3 has been rotated to the position illustrated in Figure 4.

As especially exemplified in Figure 7, the body 1 is preferably formed to provide an integral cylindrical portion 7 on the end opposite the threaded portion 8, illustrated in Figures 2 and 3, and a transverse slot 9 in which a cam 10 is pivotally arranged, as illustrated in Figures 4 and 5, through the medium of a pin 11 which is received by a notch $a$ formed in the arcuate outer edge of the member 10. By reason of the cylindrical portion 7 of the body 1, a shoulder $b$ is formed, as shown more in detail in Figure 7, and the slot 9 is positioned intermediate the end of the body 1 and the shoulder $b$ and its purpose will become manifest presently.

A cylindrical ferrule, or sleeve 12, is adapted to rotatably encase the body 1, as illustrated more particularly in Figures 2 and 3, and is provided with a pair of internal annular ribs $c$ and $d$ defining an annular groove 13 therebetween. The innermost rib $c$ is adapted to engage the shoulder $b$ of the body 1, as illustrated in Figures 2 and 3, to limit the longitudinal movement of the sleeve 12 upon the body 1 and to cause the groove 13 to be automatically aligned with the slot 9 so that the cam 10 may be received by the groove, as exemplified by Figures 4 and 5. Figure 4 illustrates the cam 10 extending into the groove 13 to retain the ferrule 12 on the body 1 yet permitting the same to freely rotate thereon. Figure 5 depicts the cam 10 in retracted position having been removed from the groove 13 permitting the ferrule 12 to be withdrawn from the body 1 to allow access to the latter with a wrench, or similar instrument, by which the body 1 may be unthreaded.

The lock 3 is provided with a groove 14 which does not extend circumferentially therearound but is substantially U-shaped in cross section, as shown in Figures 4 and 5, providing a substantial cam action whereby the cam 10 is caused to function and be moved into and away from the groove 13. It is pointed out that, while the cam 10 is formed to substantially conform to the circular contour of the inner periphery of the rib c, as shown in Figure 5, the inner arcuate edge of the cam 10 is eccentrically arranged with respect to the axial contour of the lock 3 and is therefore amenable to the action of the peculiar shaped body e of the latter within the groove 14, so that when the lock 3 is rotated by the key 6 to the position illustrated in Figure 4, the cam 10 is raised into the groove 13 in the ferrule 12 securing the same against longitudinal movement on the body 1. The tumblers 4 are stopped in alignment with the slots 5 in the body 1 when the lock is rotated to the position shown in Figure 4 so that the shoulder g is urged against one end of the cam 10 projecting the same into the groove 13.

Conversely, when the lock 3 is rotated to the position illustrated in Figure 5, the opposite end of the cam 10 is urged upwardly by the shoulder h at the opposite end of the groove 14 causing the cam 10 to "rock" and thus be withdrawn from the groove 13 to permit the removal of the ferrule 12 from the body 1, the end f of the slot 9, as illustrated in Figure 5, forming a stop for the cam 10 limiting its downward movement and insuring its proper function and properly aligning the tumblers 4 with the slots 5. The tumblers 4 of the lock 3 extend into the slots 5, in the manner shown in Figure 6, when the lock 3 is turned to the position shown in Figure 4, retaining the cam 10 in the groove 13 and in what is termed the locked position.

Manifestly, the structure herein shown and described is capable of considerable changes and modifications from time to time by those skilled in the art, and such changes and modifications as may be resorted to and which may be considered as falling within the spirit and intent of the invention may also be considered as coming within the scope of the appended claims.

What is claimed is:

1. In a locking device for nuts, in combination with a body having a central bore threaded at one end to receive a bolt, a lock arranged in the said bore opposite the said threaded portion, a cylindrical portion at one end of the said body forming a shoulder exteriorly thereof and having a transverse slot intermediate its ends, a ferrule having an annularly grooved internal rib at one end encasing the said body and adapted for free rotation thereon, the said rib engaging the said shoulder, a cam pivoted in the slot in the said cylindrical portion and adapted to normally project into the groove in the said rib, and means forming a part of the said lock operating the said cam.

2. In a locking device for nuts and bolts, in combination with a hollow polygonal body having a tubular lock arranged therein, a substantially reduced cylindrical portion on one end of the said body forming a shoulder, a ferrule rotatably enveloping the said body and having an internal annular shoulder engaging the shoulder on the said body, an annular groove in said annular shoulder, a slot formed in a segment of the circumference of said reduced portion, a cam pivotally arranged in the said slot capable of entering said groove to provide a positive connection between the said ferrule and the said body, and means forming a part of the said lock actuating the said cam for releasing the said connection.

3. In a locking device for nuts and bolts, in combination, a polygonal body having a threaded section at one end and a bore at the opposite end, a rotatable lock having slidable projecting tumblers positioned within the said bore, a groove partially encircling one end of said lock forming a cam, a ferrule having annular ribs in one end defining an annular groove therebetween enveloping said body and adapted to free rotation thereon, a slot formed in said body transverse to its axis and near one end, a cam pivotally arranged in the said slot and adapted to partially project into the first named groove providing a rotative connection between said body and said ferrule, the said cam formed by the said first named groove providing means for actuating said pivoted cam and normally retaining the said ferrule on the said body.

LEWIS F. HOWARD.

REFERENCES CITED

The following references are of record in the file of this patent:

UNITED STATES PATENTS

| Number | Name | Date |
|---|---|---|
| 1,805,779 | Metz et al. | May 19, 1931 |

FOREIGN PATENTS

| Number | Country | Date |
|---|---|---|
| 310,932 | Great Britain | Feb. 6, 1930 |